United States Patent
Rasool et al.

(10) Patent No.: US 12,308,941 B2
(45) Date of Patent: May 20, 2025

(54) NEIGHBOR LOW EARTH ORBIT/HIGH ALTITUDE PLATFORM STATIONS INTER-SATELLITE LINK CHANGE AND SYNCHRONIZATION SIGNAL BLOCK MEASUREMENTS

(71) Applicant: Nokia Technologies Oy, Espoo (FI)

(72) Inventors: Shahzada Basharat Rasool, Naperville, IL (US); Mads Lauridsen, Gistrup (DK); Jeroen Wigard, Klarup (DK); Rafhael Medeiros De Amorim, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 186 days.

(21) Appl. No.: 18/246,940

(22) PCT Filed: Sep. 21, 2021

(86) PCT No.: PCT/EP2021/075845
§ 371 (c)(1),
(2) Date: Mar. 28, 2023

(87) PCT Pub. No.: WO2022/078718
PCT Pub. Date: Apr. 21, 2022

(65) Prior Publication Data
US 2023/0412257 A1    Dec. 21, 2023

Related U.S. Application Data

(60) Provisional application No. 63/092,206, filed on Oct. 15, 2020.

(51) Int. Cl.
*H04B 7/185* (2006.01)
*H04B 7/195* (2006.01)

(52) U.S. Cl.
CPC ..... *H04B 7/18539* (2013.01); *H04B 7/18521* (2013.01); *H04B 7/195* (2013.01)

(58) Field of Classification Search
CPC ............ H04B 7/18539; H04B 7/18521; H04B 7/195; H04B 7/18504; H04W 48/12; H04L 5/0053
See application file for complete search history.

(56) References Cited

U.S. PATENT DOCUMENTS

2010/0124179 A1 * 5/2010 Lee ...................... H04W 48/08
370/252
2020/0322908 A1 * 10/2020 Prakash .............. H04W 56/001
(Continued)

FOREIGN PATENT DOCUMENTS

| WO | 2020/067973 A1 | 4/2020 |
| WO | 2020/089848 A1 | 5/2020 |

(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

(Continued)

*Primary Examiner* — Christine Ng
(74) *Attorney, Agent, or Firm* — Robert P. Michal, Esq.; Carter, DeLuca & Farrell LLP (57) ABSTRACT

A method and apparatus may include identifying, by a network entity, at least one link change corresponding with at least one round trip time (RTT) change, and transmitting, by the network entity, at least one first indication of the at least one link change to at least one serving network entity. The at least one first indication is configured to cause the at least one serving network entity to transmit at least one (Continued)

second indication of the at least one RTT change to at least one user equipment.

1 Claim, 9 Drawing Sheets

(56) References Cited

U.S. PATENT DOCUMENTS

| | | | | |
|---|---|---|---|---|
| 2020/0374735 | A1* | 11/2020 | Wei | H04L 5/0091 |
| 2021/0014751 | A1* | 1/2021 | Callender | H04W 72/0446 |
| 2021/0158151 | A1* | 5/2021 | Wang | H04L 12/189 |
| 2022/0225197 | A1* | 7/2022 | Yang | H04W 48/18 |
| 2022/0279394 | A1* | 9/2022 | Gao | H04W 48/20 |
| 2023/0007523 | A1* | 1/2023 | Fu | H04B 7/18541 |
| 2023/0284060 | A1* | 9/2023 | Euler | H04W 24/10 |
| | | | | 370/329 |

FOREIGN PATENT DOCUMENTS

| | | |
|---|---|---|
| WO | 2020/091647 A1 | 5/2020 |
| WO | 2020/092561 A1 | 5/2020 |

OTHER PUBLICATIONS

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"Solutions for NR to support non-terrestrial networks (NTN)", 3GPP TSG RAN meeting #86, RP-193234, Agenda: 9.1.2, Thales, Dec. 9-13, 2019, 10 pages.

"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-140.

Sano et al., "5G Radio Performance and Radio Resource Management Specifications", NTT Docomo, Technical Journal, vol. 20, No. 3, Jan. 2019, pp. 79-95.

"Discussion on SSB measurement in NTN", 3GPP TSG-RAN2 Meeting #108, R2-1915189, Agenda: 6.6.4.3, Huawei, Nov. 18-22, 2019, pp. 1-5.

"3rd Generation Partnership Project; Technical Specification Group Radio Access Network; NR; Requirements for support of radio resource management (Release 16)", 3GPP TS 38.133, V16.3.0, Mar. 2020, 1169 pages.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"Switching the Feeder Link Toward the Satellite", 3GPP TSG-RAN WG3 #103, R3-190812, Agenda: 20.2.4.4, Ericsson, Feb. 25-Mar. 1, 2019, 8 pages.

International Search Report and Written Opinion received for corresponding Patent Cooperation Treaty Application No. PCT/EP2021/075845, dated Dec. 23, 2021, 15 pages.

"Discussion on mobility management for connected mode UE in NRN", 3GPP TSG-RAN WG2 Meeting #111-e, R2-2006784, Agenda: 8.10.3.2, OPPO, Aug. 17-28, 2020, 4 pages.

"Measurement Issues for NTN System", 3GPP TSG-RAN WG2 Meeting #107bis, R2-1912157, Agenda: 6.6.4.1, CATT, Oct. 14-18, 2019, 9 pages.

"Discussion on delay difference on measurements for NTN", 3GPP TSG RAN WG2#111-e, R2-2007955, Agenda: 8.10.3.2, Asia Pacific Telecom, Aug. 17-28, 2020, 4 pages.

* cited by examiner

$t_0$: Measurements before neighbor link change $t_1$: Measurements after neighbor link change, where neighbor SSB falls outside of measurement windows and UE will not detect SSB. Need to convey offset to UE.

Serving cell can broadcast jump in SMTC configuration for impacted neighbor cells and UE re-configure SMTC (and gap) offset to re-align measurement windows.

$t_1$: Measurements with neighbor link jump communication

NEIGHBOR LOW EARTH ORBIT/HIGH ALTITUDE PLATFORM STATIONS INTER-SATELLITE LINK CHANGE AND SYNCHRONIZATION SIGNAL BLOCK MEASUREMENTS

RELATED APPLICATION

This application claims priority to PCT Application No. PCT/EP2021/075845, filed on Sep. 21, 2021, which claims priority to U.S. Provisional Application No. 63/092,206 filed on Oct. 15, 2020, each of which is incorporated herein by reference in its entirety.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for reconfiguring relevant synchronization signal block measurement time configuration (SMTC) parameters to respond to changes in signal arrival times.

BACKGROUND

Examples of mobile or wireless telecommunication systems may include 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine type communication (mMTC). NR is expected to deliver extreme broadband, ultra-robust, low latency connectivity, and massive networking to support the Internet of Things (IoT). The next generation radio access network (NG-RAN) represents the RAN for 5G, which may provide radio access for NR, LTE, and LTE-A. It is noted that the nodes, in 5G, providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some embodiments, a method may include identifying, by a network entity, at least one link change corresponding with at least one round trip time (RTT) change. The method may further include transmitting, by the network entity, at least one first indication of the at least one link change to at least one serving network entity. The at least one first indication may be configured to cause the at least one serving network entity to transmit at least one second indication of the at least one RTT change.

In accordance with certain embodiments, an apparatus may include means for identifying at least one link change corresponding with at least one round trip time (RTT) change. The apparatus may further include means for transmitting at least one first indication of the at least one link change to at least one serving network entity. The at least one first indication may be configured to cause the at least one serving network entity to transmit at least one second indication of the at least one RTT change.

In accordance with various embodiments, an apparatus may include at least one processor and at least one memory including computer program code. The at least one memory and the computer program code may be configured to, with the at least one processor, cause the apparatus to at least identify at least one link change corresponding with at least one round trip time (RTT) change. The at least one memory and the computer program code may be further configured to, with the at least one processor, cause the apparatus to at least transmit at least one first indication of the at least one link change to at least one serving network entity. The at least one first indication may be configured to cause the at least one serving network entity to transmit at least one second indication of the at least one RTT change.

In accordance with some embodiments, a non-transitory computer readable medium may be encoded with instructions that may, when executed in hardware, perform a method. The method may include identifying at least one link change corresponding with at least one round trip time (RTT) change. The method may further include transmitting at least one first indication of the at least one link change to at least one serving network entity. The at least one first indication may be configured to cause the at least one serving network entity to transmit at least one second indication of the at least one RTT change.

In accordance with certain embodiments, a computer program product may perform a method. The method may include identifying at least one link change corresponding with at least one round trip time (RTT) change. The method may further include transmitting at least one first indication of the at least one link change to at least one serving network entity. The at least one first indication may be configured to cause the at least one serving network entity to transmit at least one second indication of the at least one RTT change.

In accordance with various embodiments, an apparatus may include circuitry configured to identify at least one link change corresponding with at least one round trip time (RTT) change. The circuitry may further be configured to transmit at least one first indication of the at least one link change to at least one serving network entity. The at least one first indication may be configured to cause the at least one serving network entity to transmit at least one second indication of the at least one RTT change.

In accordance with some embodiments, a method may include receiving, by a network entity, at least one first indication of at least one link change from at least one neighbor network entity. The method may further include determining, by the network entity, at least one RTT change based upon at least one round trip time (RTT) change related to the at least one link change. The method may further include transmitting, by the network entity, the at least one RTT change to at least one user equipment.

In accordance with certain embodiments, an apparatus may include means for receiving at least one first indication of at least one link change from at least one neighbor network entity. The apparatus may further include means for determining at least one RTT change based upon at least one round trip time (RTT) change related to the at least one link change. The apparatus may further include means for transmitting the at least one RTT change to at least one user equipment.

In accordance with various embodiments, an apparatus may include at least one processor and at least one memory including computer program code. The at least one memory and the computer program code may be configured to, with the at least one processor, cause the apparatus to at least receive at least one first indication of at least one link change from at least one neighbor network entity. The at least one memory and the computer program code may be further configured to, with the at least one processor, cause the apparatus to at least determine at least one RTT change based upon at least one round trip time (RTT) change related to the at least one link change. The at least one memory and the computer program code may be further configured to, with the at least one processor, cause the apparatus to at least transmit the at least one RTT change to at least one user equipment.

In accordance with some embodiments, a non-transitory computer readable medium may be encoded with instructions that may, when executed in hardware, perform a method. The method may include receiving at least one first indication of at least one link change from at least one neighbor network entity. The method may further include determining at least one RTT change based upon at least one round trip time (RTT) change related to the at least one link change. The method may further include transmitting the at least one RTT change to at least one user equipment.

In accordance with certain embodiments, a computer program product may perform a method. The method may include receiving at least one first indication of at least one link change from at least one neighbor network entity. The method may further include determining at least one RTT change based upon at least one round trip time (RTT) change related to the at least one link change. The method may further include transmitting the at least one RTT change to at least one user equipment.

In accordance with various embodiments, an apparatus may include circuitry configured to receive at least one first indication of at least one link change from at least one neighbor network entity. The circuitry may further be configured to determine at least one RTT change based upon at least one round trip time (RTT) change related to the at least one link change. The circuitry may further be configured to transmit the at least one RTT change to at least one user equipment.

In accordance with some embodiments, a method may include receiving, by a user equipment, at least one first indication indicating when to apply at least one offset synchronization signal block measurement time configuration (SMTC) and at least one measurement gap window based on at least one round trip time (RTT) change. The method may further include receiving, by the user equipment, at least one physical cell identity and the at least one RTT change. The method may further include adjusting, by the user equipment, the at least one SMTC at the at least one time.

In accordance with certain embodiments, an apparatus may include means for receiving at least one first indication indicating when to apply at least one offset synchronization signal block measurement time configuration (SMTC) and at least one measurement gap window based on at least one round trip time (RTT) change. The apparatus may further include means for receiving at least one physical cell identity and the at least one RTT change. The apparatus may further include means for adjusting the at least one SMTC at the at least one time.

In accordance with various embodiments, an apparatus may include at least one processor and at least one memory including computer program code. The at least one memory and the computer program code may be configured to, with the at least one processor, cause the apparatus to at least receive at least one first indication indicating when to apply at least one offset synchronization signal block measurement time configuration (SMTC) and at least one measurement gap window based on at least one round trip time (RTT) change. The at least one memory and the computer program code may be further configured to, with the at least one processor, cause the apparatus to at least receive at least one physical cell identity and the at least one RTT change. The at least one memory and the computer program code may be further configured to, with the at least one processor, cause the apparatus to at least adjust the at least one SMTC at the at least one time.

In accordance with some embodiments, a non-transitory computer readable medium may be encoded with instructions that may, when executed in hardware, perform a method. The method may include receiving at least one first indication indicating when to apply at least one offset synchronization signal block measurement time configuration (SMTC) and at least one measurement gap window based on at least one round trip time (RTT) change. The method may further include receiving at least one physical cell identity and the at least one RTT change. The method may further include adjusting the at least one SMTC at the at least one time.

In accordance with certain embodiments, a computer program product may perform a method. The method may include receiving at least one first indication indicating when to apply at least one offset synchronization signal block measurement time configuration (SMTC) and at least one measurement gap window based on at least one round trip time (RTT) change. The method may further include receiving at least one physical cell identity and the at least one RTT change. The method may further include adjusting the at least one SMTC at the at least one time.

In accordance with various embodiments, an apparatus may include circuitry configured to receive at least one first indication indicating when to apply at least one offset synchronization signal block measurement time configuration (SMTC) and at least one measurement gap window based on at least one round trip time (RTT) change. The circuitry may further be configured to receive at least one physical cell identity and the at least one RTT change. The circuitry may further be configured to adjust the at least one SMTC at the at least one time.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for reconfiguring relevant synchronization signal block measurement time configuration (SMTC) parameters to respond to changes in signal arrival times is not intended to limit the scope of certain embodiments, but is instead representative of selected example embodiments.

Figure 1:
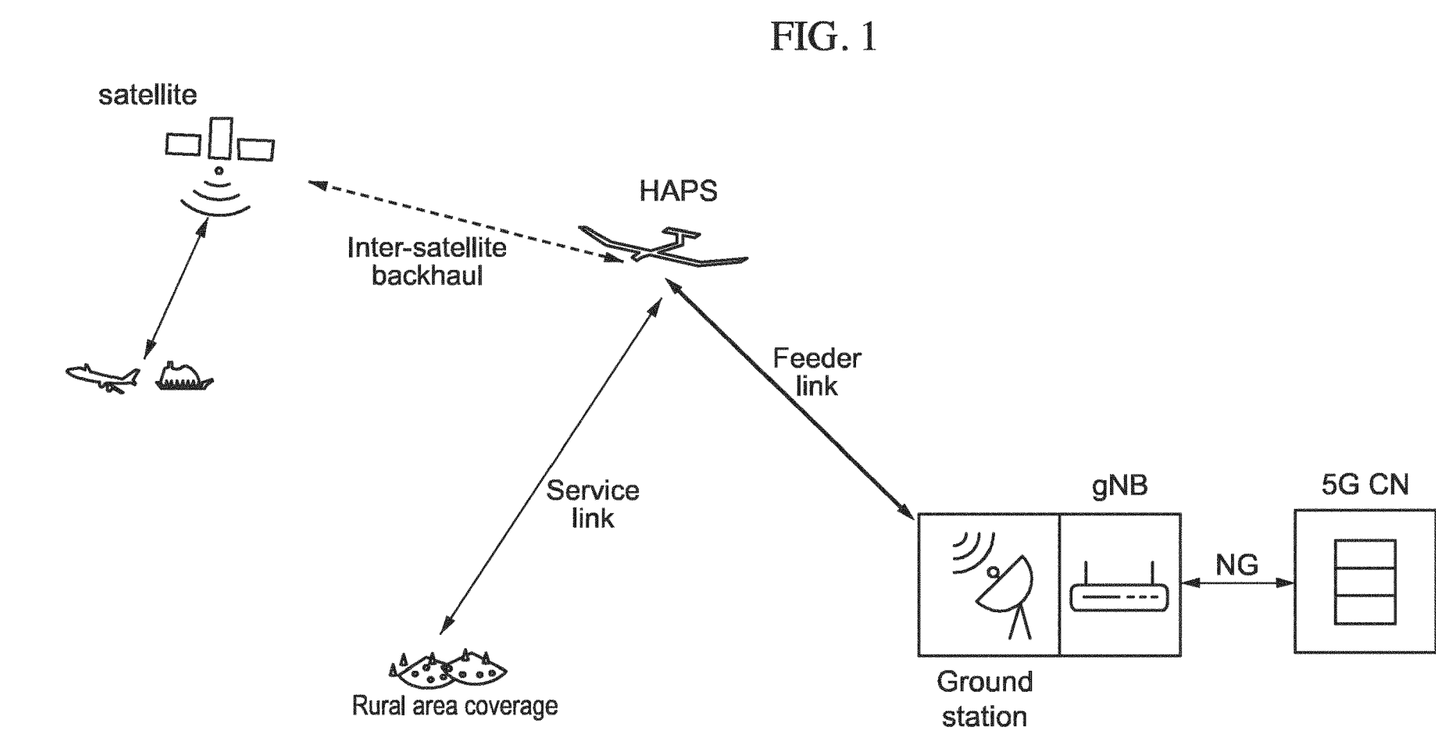
FIG. 1 illustrates an example of a non-terrestrial network with inter-satellite links.

In 3GPP, non-terrestrial networks (NTN) can include low Earth orbit (LEO) satellites, geostationary orbit (GEO) satellites, and High Altitude Platform Stations (HAPS) in NR deployments. As illustrated in FIG. 1, NTNs may include service or access links between satellites/HAPS and UEs, as well as feeder links between satellites/HAPS and ground stations. Feeder links may connect satellites to the core network, including ground-based components such as network entities. This architecture may further include bent pipe or transparent satellites, where ground stations provide all radio functionality, and satellites serve as an RF repeater. Such transparent satellites may be characterized by large round-trip times (RTT) due to the RF signal needing to traverse feeder and service links.

Some architectures also include transparent and bent pipe HAPS/LEDs, where network entities, including their centralized unit (CU) and distributed unit (DU) functionalities, are on the ground. User equipment (UE) registered in the network, whether idle or connected, may need to measure the synchronization signal block (SSB) of neighboring cells for mobility purposes. The SSB from different neighbor cells may use the same or different SSB configurations, including SSB identifiers and/or periodicities. Based on the information of neighbor SSB configurations, the serving cell configures neighbor measurements through broadcast (e.g., SIB2 and SIB4) and/or dedicated signaling.

High altitude platform stations (HAPS) can be included as a part of telecommunications infrastructure for rural and remote areas using stratospheric, airborne platforms. HAPS can operate at altitudes between 3 and 50 kilometers (km), and provide service up to 1,000 km away with a service area of 800,000 km$^2$, depending on the minimum elevation angle received from the user's location. HAPS may also be provided on balloons and/or solar-powered, high-altitude planes. 3GPP provides consideration of how HAPS co-exists with other NTNs, including LEO and GEO satellites. Co-existence challenges may occur when operating a HAPS as part of the same public land mobile network (PLMN) on the same frequency as the terrestrial network.

HAPS can generally fill coverage gaps of terrestrial networks with negligible interference in the areas covered by the terrestrial network. However, handovers between terrestrial cells and HAPS can be complex. In addition, handovers from HAPS to terrestrial cells may shield UE from terrestrial interference, while handovers from terrestrial cells to HAPS can protect UE from terrestrial coverage holes.

Figure 2:
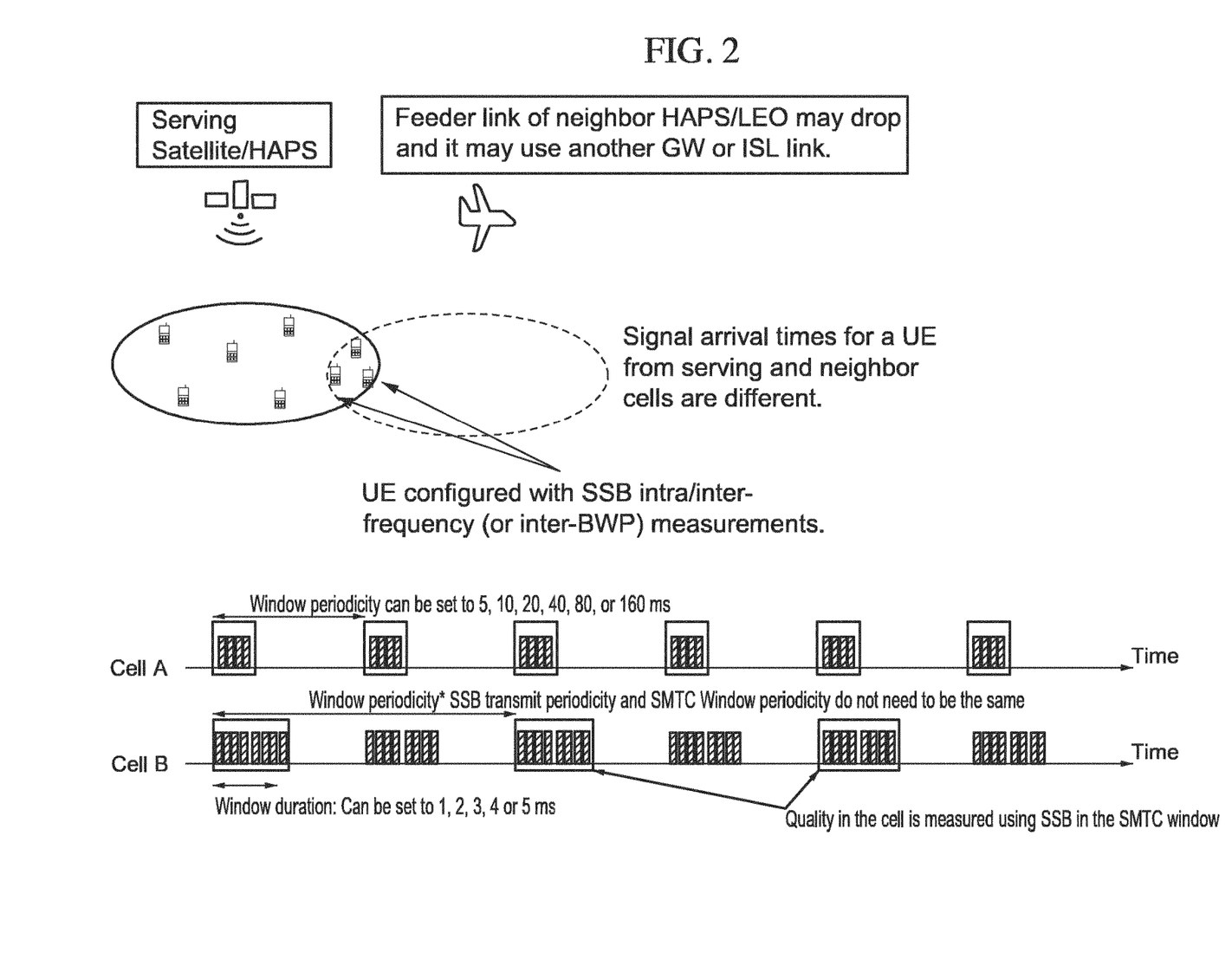
FIG. 2 illustrates an example of a user equipment needing to measure neighboring cell synchronization signal blocks.

The serving cell can also set SSB measurement time configuration (SMTC) windows, where the time reference corresponds with the system frame number (SFN) of the serving cell, as shown in FIG. 2. SMTC windows may have a duration of 1-5 milliseconds (ms), with periods of, for example, 5, 10, 20, 40, 80, 160, 320, 640, and 1280 ms. The serving cell can configure a list of physical cell identity (PCIs) for UE configured with an SMTC window, where the configuration conforms with the SSB configuration of the serving cell. For inter-frequency or inter-bandwidth part (BWP) measurements, depending on capabilities of the UE, the serving cell may configure SMTC windows and measurement gaps, with proper offsets to account for any time differences of the SSB arriving from neighboring cells. During measurement gaps, the serving cell may be unable to schedule the UE, creating challenges in ensuring that the SSB is detected within the SMTC window and keeping the window as small as possible.

If a neighboring cell adjusts its feeder link to a different ground station or alternates in having an inter-satellite link (ISL), the arrival time of SSBs at the UE may vary due to the updated RTT, and the UE may fail to detect SSBs and neighbor signal synchronization references. This may be problematic for UEs making handover determinations. The UE may also be unable to measure certain neighboring cells due to the window being misaligned as a result of the time shift, failing to hand over to those neighboring cells despite being the best cell for handover. Thus, it would be beneficial for UE to avoid failing to receive SSBs from neighboring cells due to variable propagation delays between ground stations and LEO satellites.

Figure 3:
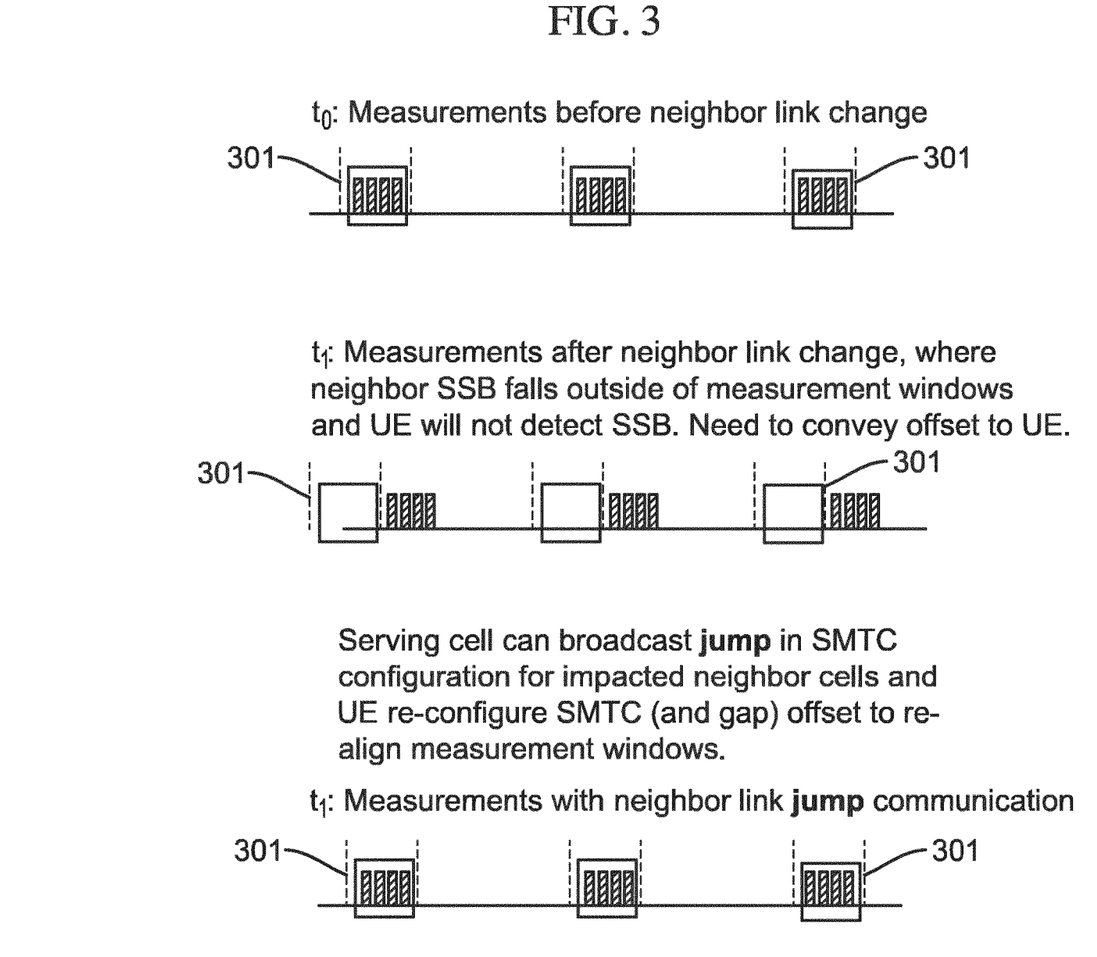
FIG. 3 illustrates an example of synchronization signal block measurement time configuration alignment before and after neighbor feeder link changes and/or inter-satellite RTT changes.

Furthermore, as illustrated in FIG. 3, if timing changes are not communicated to connected UEs which are already configured with SMTC and measurement gap configuration, UEs cannot detect neighbor SSB, which may cause handover failure for UE in handover preparation phase and/or the UE not connecting to the best possible cell since it is undetected. Boxes 301 in FIG. 3 indicate the SSBs that are transmitted, while the vertical dashed lines correspond with SMTC and measurement gap configuration times set by the serving cell. And for inter-frequency measurements with gaps, in addition to scheduling loss from serving cell due to RF re-tuning, the UE may search for a duration where there is no SSB present, rendering the UE unable to measure/ report that frequency.

Certain embodiments described herein may have various benefits and/or advantages to overcome the disadvantages described above. For example, certain embodiments may prevent measurement lapses by serving cells broadcasting to and/or performing group communication with all connected UE. Some embodiments may also provide the ability to set longer MTC periodicities with shorter measurement durations, requiring lower UE power consumption and potentially higher scheduling flexibility for RRC-connected UE. Thus, certain embodiments discussed below are directed to improvements in computer-related technology.

Figure 4:
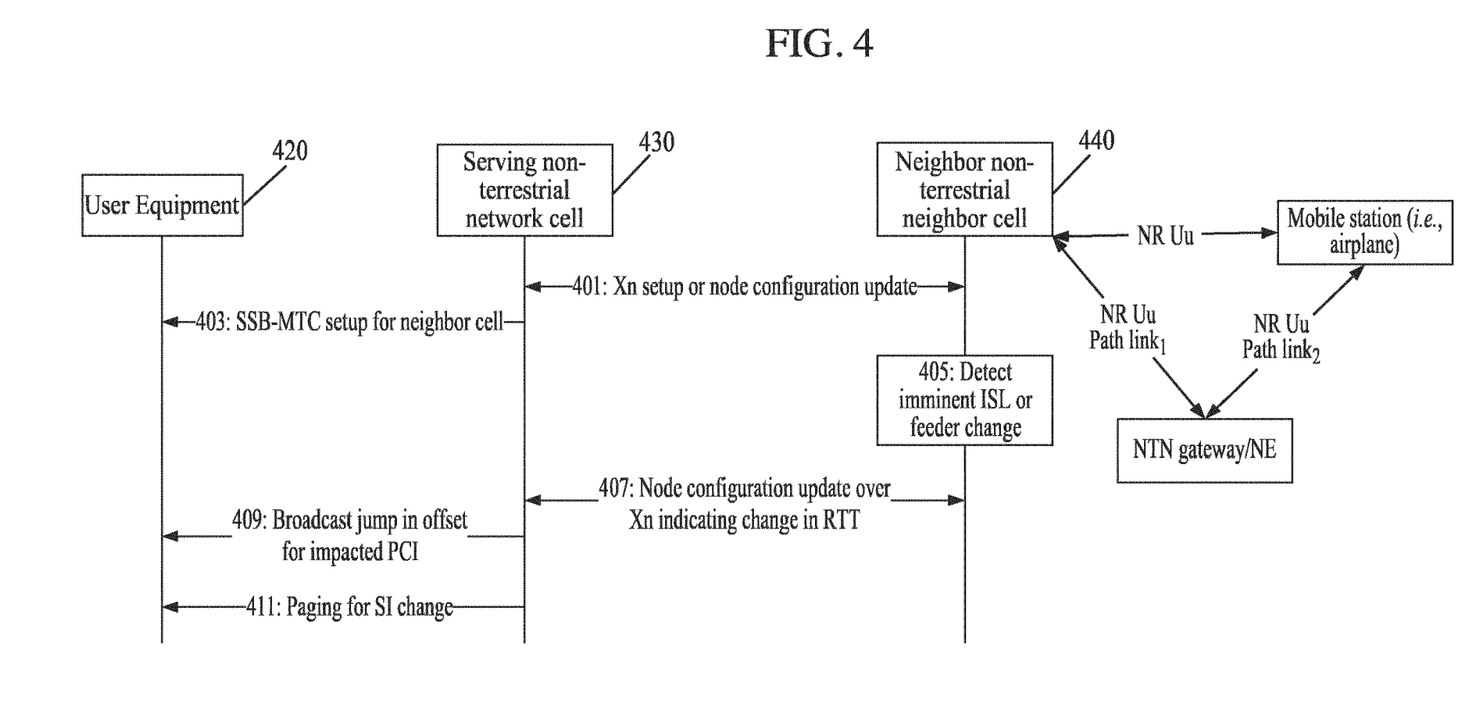
FIG. 4 illustrates an example of a signaling diagram according to certain embodiments.
Figure 8:
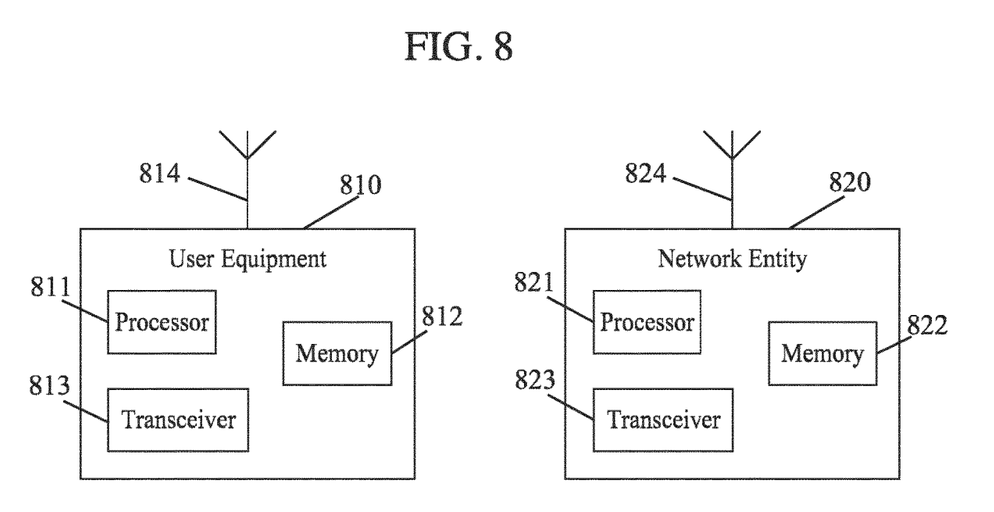
FIG. 8 illustrates an example of various network devices according to some embodiments.

FIG. 4 illustrates an example of a signaling diagram depicting how to reconfigure relevant SMTC parameters in response to changes in signal arrival times at a UE when a neighbor cell modifies ISL and/or changes feeder links. UE 420 may be similar to UE 810, and serving NTN cell 430 and neighbor NTN cell 440 may be similar to NE 820, as illustrated in FIG. 8, according to certain embodiments.

Neighbor NTN cell 440 may be a neighbor cell for which serving NTN cell 430 may configure SSB measurements (neighbor measurements) for UE 420 within its coverage range. In addition, serving NTN cell 430 and UE 420 may communicate via RRC. In various embodiments, direct feeder links (path link$_1$) of neighbor NTN cell 440 may be broken, and a new link (path link 2) may be established through an HAPS (i.e., airplane) towards the ground station NE.

At 401, serving NTN cell 430 and neighbor NTN cell 440 may perform $X_n$ setup and/or node configuration update procedures. For example, serving NTN cell 430 may receive information related to SSB configurations of neighboring cells. The information may include RTT parameters of neighboring cells.

Based upon the information received from neighbor NTN cell 440, at 403, serving NTN cell 430 may transmit to UE 420 SMTC parameters. At 405, neighbor NTN cell 440 may detect an imminent ISL and/or feeder link change, which may cause UE 420 to experience misalignment when receiving SSBs from the neighbor cell, such that received SSB fall outside of SSB measurement window resulting in UE 420 not being able to detect the SSB.

At 407, neighbor NTN cell 440 may transmit to serving NTN cell 430 indications of the imminent ISL and/or feeder link changes, which may cause UE 420 to experience misalignment when receiving SSBs from the neighbor cell. In various embodiments, the indications may update serving NTN cell 430 over $X_n$ regarding the RTT changes via an information element (IE), such as a Configuration Update $X_n$ message. Additionally or alternatively, the indications may be transmitted via an existing SSB-MTC IE, where neighbor NTN cell 440 may explicitly update offsets to SSB-MTC, including RTT changes due to the ISL/feeder link adjustments before the impending change occurs.

In certain embodiments, neighbor NTN cell 440 may transmit indications of the imminent ISL and/or feeder link adjustments with no specific delay value. Serving NTN cell 430 may update SMTC settings to an aggressive mode, such as by decreasing the SMTC periodicity and/or increasing the measurement window duration, thereby maximizing the chance of the UE finding the SSB.

Furthermore, neighbor NTN cell 440 may indicate the adjustments before the changes occur, allowing serving NTN cell 430 to update SMTC settings before experiencing the changes. For example, neighbor NTN cell 440 may indicate that it expects an RTT change period (X ms) to occur at a particular time or after a period of time (Y ms). In some embodiments, core networks and/or topology management algorithms may indicate to serving NTN cell 430 relevant information about one or more of its neighbor HAPS/LEO experiencing an RTT change.

Serving NTN cell 430 may broadcast at 409, to UE 420, the impacted neighbor PCI and RTT change (e.g., positive or negative) in delay in a broadcast message. UE 420 and serving NTN cell 430 may implicitly modify SMTC and/or measurement gap configurations based upon the broadcast RTT change. In some embodiments, in response to receiving the RTT change messages from neighbor NTN cell 440, serving NTN cell 430 may re-configure SMTC and measurement gaps of all RRC connected UEs, including UE 420, via group broadcast. This may be performed using DCI and/or RNTI. In various embodiments, the broadcast may indicate to UE 420 when to apply RTT change values in SMTC and measurement gap configurations of UE 420, such as based on SFN.

In certain embodiments, SMTC configuration changes may apply to intra-frequency measurements and/or inter-frequency measurements. Measurement gap configurations may also be updated for intra-frequency and inter-frequency measurements depending on capabilities of UE 420. Broadcast messages indicating offset changes may also be beneficial since measurement gap (MG) configurations are set per UE by dedicated signaling, and RTT change messages may adjust both SMTC and MG.

At 411, UE 420 may update its SMTC and measurement gap configurations. For example, when in IDLE mode, UE 420 may preserve outdated configuration until new SIB2/4 is transmitted at next SI modification period, at which point UE 420 may perform the update.

Figure 5:
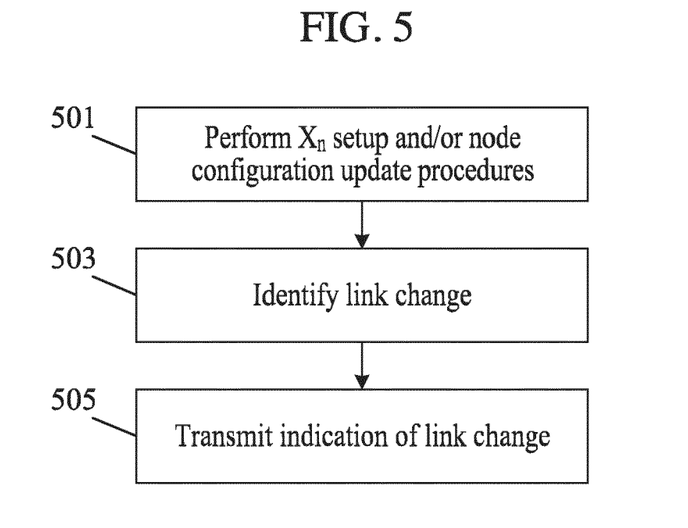
FIG. 5 illustrates an example of a flow diagram of a method that may be performed by a neighbor network entity according to various embodiments.

FIG. 5 illustrates an example of a flow diagram of a method that may be performed by a neighbor NTN cell, such as NE 820 illustrated in FIG. 8, according to various embodiments. At 501, the neighbor NTN cell and a serving NTN cell, which may also be similar to NE 820 illustrated in FIG. 8, may perform $X_n$ setup and/or node configuration update procedures. For example, the neighbor NTN cell may transmit information related to SSB configurations of neighboring cells. The information may include RTT parameters of neighboring cells.

At 503, the neighbor NTN cell may detect an imminent ISL and/or feeder link change, which may cause at least one UE, which may be similar to UE 810 in FIG. 8, to experience RTT changes, such as greater than 0.5 ms.

At 505, the neighbor NTN cell may transmit to the serving NTN cell indications of the imminent ISL and/or feeder link changes, which may be configured to cause the UE to experience RTT changes. In various embodiments, the indications may update the serving NTN cell over $X_n$ regarding the RTT changes via an IE, such as a Configuration Update $X_n$ message. Additionally or alternatively, the indications may be transmitted via an existing SSB-MTC IE, where the neighbor NTN cell may explicitly update offsets in SSB-MTC, including RTT changes due to the ISL/feeder link change before the impending change.

In certain embodiments, the neighbor NTN cell may transmit indications of the imminent ISL and/or feeder link changes with no specific delay value. Furthermore, the neighbor NTN cell may indicate the adjustments before the changes occur, allowing the serving NTN cell to update SMTC settings before experiencing the changes. For example, the neighbor NTN cell may indicate that it expects an RTT change period (X ms) to occur at a particular time or after a period of time (Y ms). In some embodiments, core networks and/or topology management algorithms may indicate to the serving NTN cell of a neighboring HAPS/LEO experiencing an RTT change.

Figure 6:
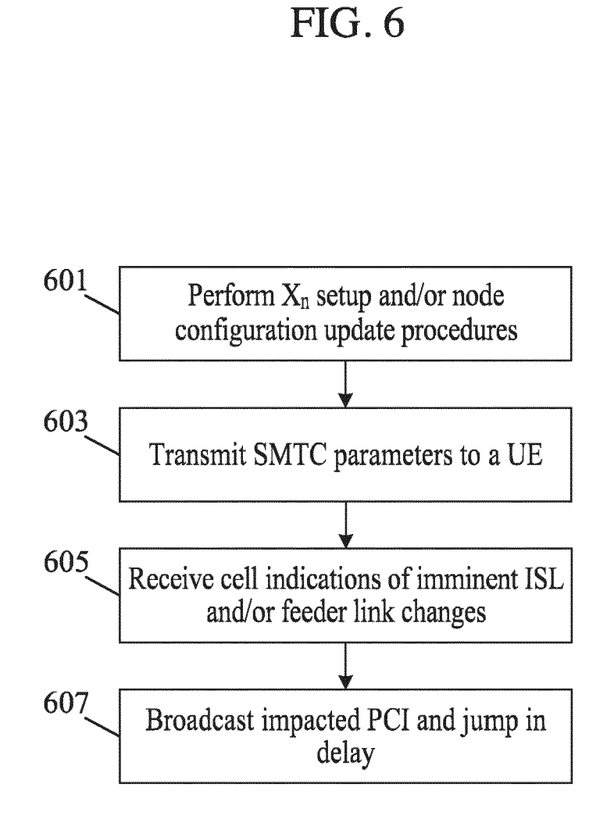
FIG. 6 illustrates another example of a flow diagram of a method that may be performed by a serving network entity according to various embodiments.

FIG. 6 illustrates an example of a flow diagram of a method that may be performed by a serving NE, such as NE 820 illustrated in FIG. 8, according to various embodiments. At 601, the serving NTN cell and a neighbor NTN cell, which may also be similar to NE 820 illustrated in FIG. 8, may perform $X_n$ setup and/or node configuration update procedures. For example, the serving NTN cell may receive information related to SSB configurations of neighboring cells. The information may include RTT parameters of neighboring cells.

Based upon the information received from the neighbor NTN cell, at 603, the serving NTN cell may transmit to a UE, which may be similar to UE 810 in FIG. 8, SMTC parameters for served UEs. At 605, the serving NTN cell may receive from the neighbor NTN cell indications of the imminent ISL and/or feeder link changes, which may cause the UE to experience RRT changes causing neighbor SSB transmissions to fall outside of the UE SSB measurement window configuration. In various embodiments, the indications may update the serving NTN cell over $X_n$ regarding the RTT changes via an information element (IE), such as a Configuration Update $X_n$ message. Additionally or alternatively, the indications may be transmitted via an existing SSB-MTC IE, where the neighbor NTN cell may explicitly update offsets in SSB-MTC, including RTT changes due to the ISL/feeder link change before the impending change.

In certain embodiments, the serving NTN cell may receive indications of the imminent ISL and/or feeder link changes with no specific delay value. The serving NTN cell may update SMTC settings to an aggressive mode, such as by decreasing the SMTC periodicity and/or increasing the measurement window duration, thereby maximizing the chance of finding the SSB. Furthermore, the serving NTN cell may receive the adjustments before the changes occur, allowing the serving NTN cell to update SMTC settings before experiencing the changes. For example, the serving NTN cell may receive indications that a neighbour NTN cell expects an RTT change period (X ms) to occur at a particular time or after a period of time (Y ms). In some embodiments, core networks and/or topology management algorithms may indicate to the serving NTN cell of a neighbour HAPS/LEO experiencing an RTT change.

The serving NTN cell may broadcast at 607 to the UE the impacted neighbor PCI and RTT change (i.e., positive or negative) in delay in a broadcast message. The UE and the serving NTN cell may implicitly modify SMTC and/or measurement gap configurations based upon the broadcast RTT change. In some embodiments, in response to receiving the RTT change messages from the neighbor NTN cell, the serving NTN cell may re-configure SMTC and measurement gaps of all RRC connected UEs, including the UE, via group broadcast. This may be performed using DCI and/or RNTI. In various embodiments, the broadcast may indicate to the UE when to apply RTT change values in SMTC and measurement gap configurations of the UE, such as based on SFN.

In certain embodiments, SMTC configuration changes may apply to intra-frequency measurements and/or inter-frequency measurements. Measurement gap configurations may also be updated for intra-frequency and inter-frequency measurements depending on capabilities of the UE. Broadcast messages indicating offset changes may also be beneficial since measurement gap configurations are set per UE by dedicated signaling, and RTT change messages may adjust both SMTC and MG.

Figure 7:
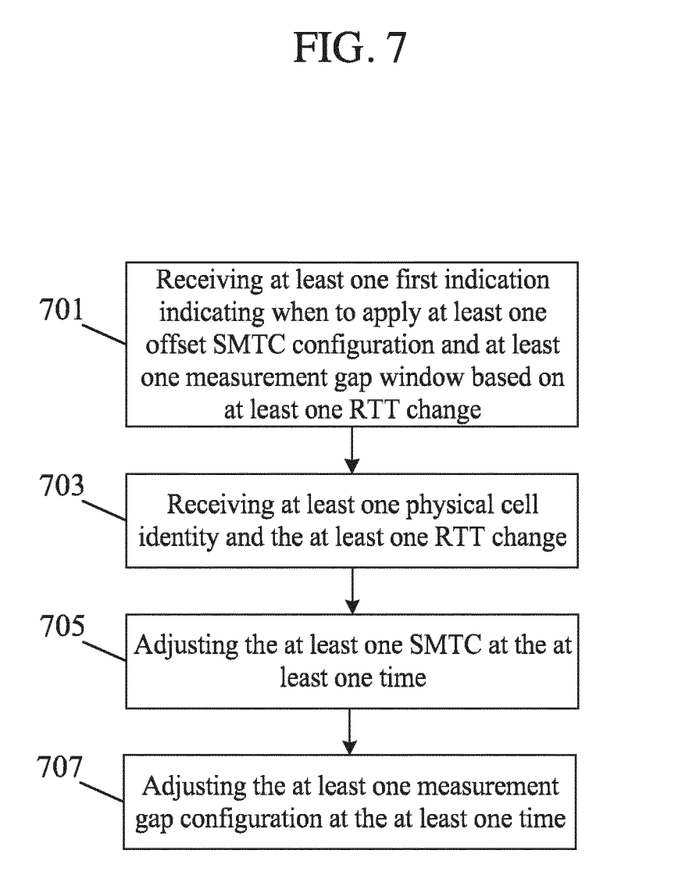
FIG. 7 illustrates another example of a flow diagram of a method that may be performed by a user equipment according to various embodiments.

FIG. 7 illustrates an example of a flow diagram of a method that may be performed by a user equipment, such as UE 810 illustrated in FIG. 8, according to various embodiments. At 701, the UE may receive at least one first indication indicating when to apply at least one offset SMTC configuration and at least one measurement gap window based on at least one RTT change. At 703, the UE may receive at least one physical cell identity and the at least one RTT change. At 705, the UE may adjust the at least one SMTC at the at least one time. At 707, the UE may adjust the at least one measurement gap configuration at the at least one time.

FIG. 8 illustrates an example of a system according to certain example embodiments. In one example embodiment, a system may include multiple devices, such as, for example, UE 810 and/or NE 820.

UE 810 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 820 may be one or more of a base station, such as an eNB or gNB, a serving gateway, a server, and/or any other access node or combination thereof. Furthermore, UE 810 and/or NE 820 may be one or more of a citizens broadband radio service device (CBSD).

NE 820 may further comprise at least one gNB-CU, which may be associated with at least one gNB-DU. The at least one gNB-CU and the at least one gNB-DU may be in communication via at least one F1 interface, at least one $X_n$-C interface, and/or at least one NG interface via a 5GC.

UE 810 and/or NE 820 may include at least one processor, respectively indicated as 811 and 821. Processors 811 and 821 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 812 and 822. The memory may be fixed or removable. The memory may include computer program instructions or computer code contained therein. Memories 812 and 822 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 811 and 821, memories 812 and 822, and any subset thereof, may be configured to provide means corresponding to the various blocks of FIGS. 4-7. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 8, transceivers 813 and 823 may be provided, and one or more devices may also include at least one antenna, respectively illustrated as 814 and 824. The device may have many antennas, such as an array of antennas configured for multiple input multiple output (MIMO) communications, or multiple antennas for multiple RATs. Other configurations of these devices, for example, may be provided. Transceivers 813 and 823 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (e.g., FIGS. 4-7). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 4-7. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

Figure 9:
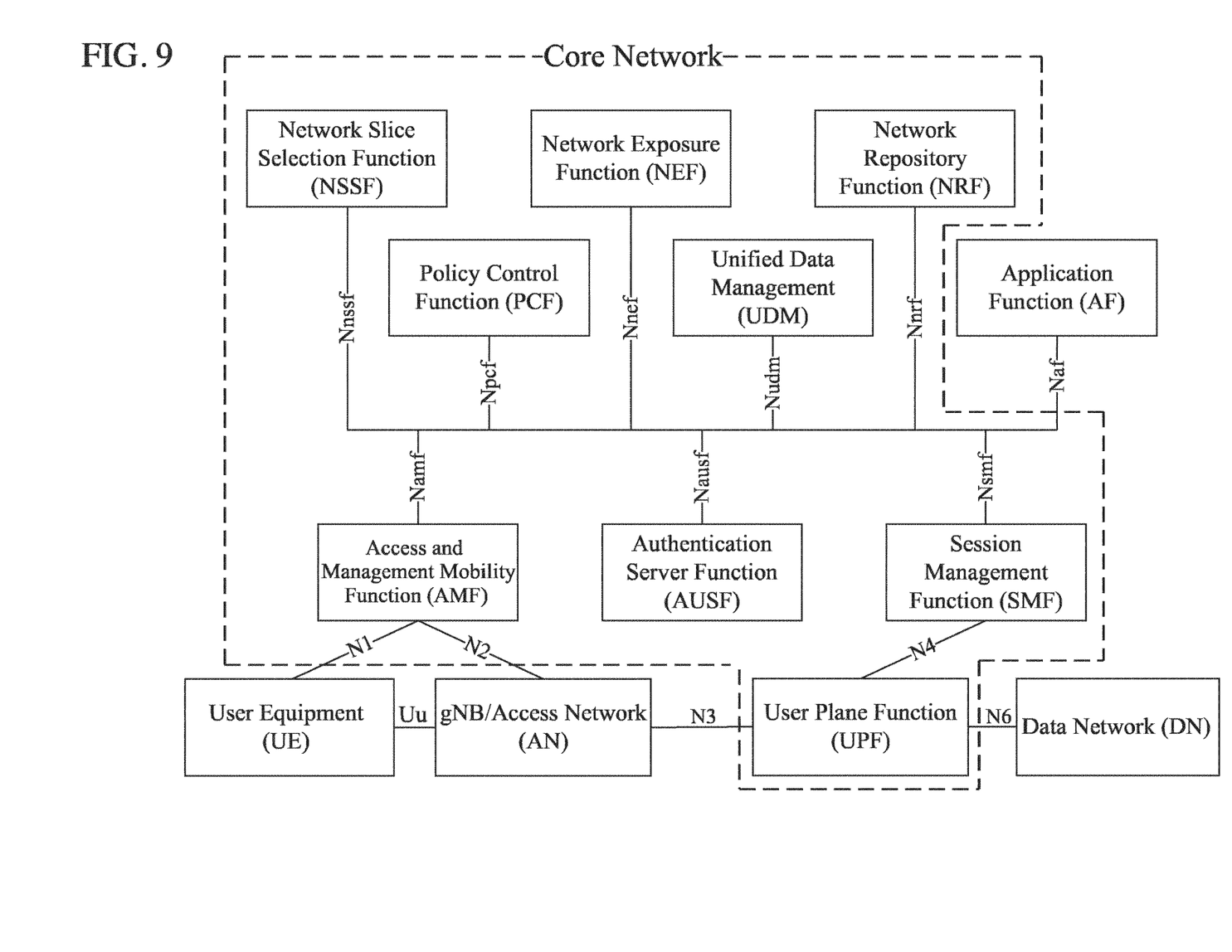
FIG. 9 illustrates an example of a 5G network and system architecture according to certain embodiments.

FIG. 9 illustrates an example of a 5G network and system architecture according to certain embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 9 may be similar to UE 810 and NE 820, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

Partial Glossary

3GPP Third Generation Partnership Project
5G Fifth Generation
5GC Fifth Generation Core
5GS Fifth Generation System
AMF Access and Mobility Management Function
ASIC Application Specific Integrated Circuit
BS Base Station
BWP Bandwidth Part
CBSD Citizens Broadband Radio Service Device
CN Core Network
CPU Central Processing Unit
CU Centralized Unit
DCI Downlink Control Information
DU Distributed Unit
eMBB Enhanced Mobile Broadband
eMTC Enhanced Machine Type Communication
eNB Evolved Node B
EPS Evolved Packet System
GEO Geostationary Orbit
gNB Next Generation Node B
GPS Global Positioning System
HAPS High Altitude Platform Station
HDD Hard Disk Drive
IE Information Element
ISL Inter-Satellite Link
LEO Low Earth Orbit
LTE Long-Term Evolution
LTE-A Long-Term Evolution Advanced
MAC Medium Access Control
MCS Modulation and Coding Scheme
MEMS Micro Electrical Mechanical System
MG Measurement Gap
MGL Measurement Gap Length
MIMO Multiple Input Multiple Output
MME Mobility Management Entity
mMTC Massive Machine Type Communication
MPDCCH Machine Type Communication Physical Downlink Control Channel
MTC Machine Type Communication
NACK Negative Acknowledgement
NAS Non-Access Stratum
NB-IoT Narrowband Internet of Things
NE Network Entity
NG Next Generation
NG-eNB Next Generation Evolved Node B
NG-RAN Next Generation Radio Access Network
NTN Non-Terrestrial Network
NR New Radio
NR-U New Radio Unlicensed
PCI Physical Cell Identity
PDA Personal Digital Assistance
PLMN Public Land Mobile Network
RAM Random Access Memory
RAN Radio Access Network
RAT Radio Access Technology
RNTI Radio Network Temporary Identifier
RRC Radio Resource Control
RS Reference Signal
RTT Round Trip Time
SAT Satellite
SFN System Frame Number SI System Information
SIB System Information Block
SMF Session Management Function
SMTC Synchronization Signal Block Measurement Time Configuration
SSB Synchronization Signal Block
SSB-MTC Synchronization Signal Block Measurement Time Configuration
UE User Equipment
UL Uplink
UMTS Universal Mobile Telecommunications System
URLLC Ultra-Reliable and Low-Latency Communication
UTRAN Universal Mobile Telecommunications System Terrestrial Radio Access Network
WLAN Wireless Local Area Network

The invention claimed is:

1. A method, comprising:
receiving, by a user equipment, at least one first indication indicating when to apply at least one offset synchronization signal block measurement time (SMTC) configuration and at least one measurement gap window based on at least one round trip time (RTT) change, wherein the at least one RTT change is transmitted to at least one core network or controlling unit configured to notify at least one neighbor network entity with at least one next generation (NG) interface;
receiving, by the user equipment, at least one physical cell identity and the at least one RTT change;
updating measurement gap configurations for intra-frequency and inter-frequency measurements based on capabilities of the user equipment;
broadcasting messages indicating offset changes, wherein RTT change messages are configured to adjust both SMTC and measurement gap (MG);
adjusting, by the user equipment, the at least one SMTC at at least one time, wherein the at least one SMTC is adjusted by decreasing SMTC periodicity and increasing the at least one measurement gap window, wherein when in idle mode the user equipment preserves an outdated SMTC configuration until a new system information block 2 (SIB2) or system information block 4 (SIB4) is transmitted, wherein changes to the outdated SMTC configuration applies to intra-frequency measurements and/or inter-frequency measurements; and
adjusting, by the user equipment, at least one measurement gap configuration at the at least one time.

* * * * *